Oct. 2, 1928.
A. ROTH
1,686,035
MAXIMUM DEMAND DEVICE
Filed April 15, 1925
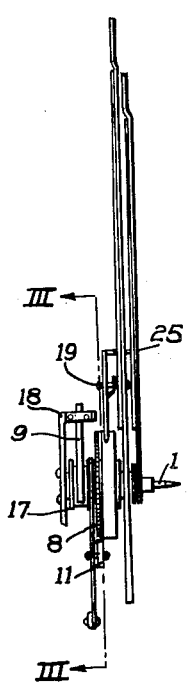
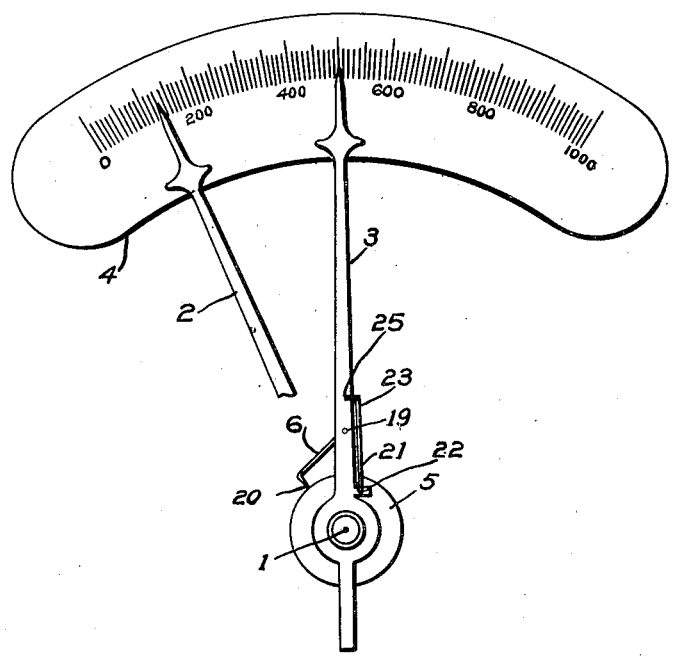
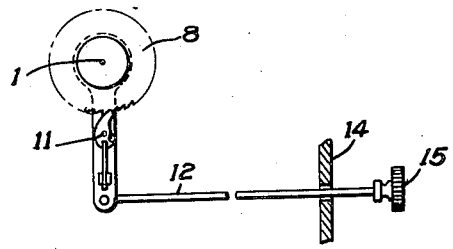
WITNESSES:
INVENTOR
Albert Roth.
BY
ATTORNEY Patented Oct. 2, 1928.

1,686,035

UNITED STATES PATENT OFFICE.

ALBERT ROTH, OF PITTSBURGH, PENNSYLVANIA, ASSIGNOR TO WESTINGHOUSE ELECTRIC & MANUFACTURING COMPANY, A CORPORATION OF PENNSYLVANIA.

MAXIMUM-DEMAND DEVICE.

Application filed April 15, 1925. Serial No. 23,414.

My invention relates to maximum-demand devices, and particularly to means for holding and resetting the maximum-demand pointers of electrical demand meters.

One object of my invention is to provide a device of the above indicated character that shall prevent the displacement of a maximum-demand pointer from indicating position by shocks and jars.

Another object of my invention is to provide a simple and effective means for resetting a maximum-demand pointer to its initial or zero position.

Another object of my invention is to provide means for positively securing a maximum-demand pointer to a holding member in any position to which the pointer may be moved.

A further object of my invention is to provide a maximum-demand indicating device that shall be simple and durable in construction and effective in its operation.

Heretofore, it has been usual, in maximum-demand meters, to provide driving and driven demand pointers, the driven pointer of which is frictionally held in the maximum position to which it is moved by the driving pointer. This construction is ordinarily effective where no vibrations or shocks are likely to occur to the instrument. However, where the meters are subject to any considerable vibration or shocks, displacement of the driven pointer from its indicating position occurs, thus rendering the instrument inaccurate.

In practicing my invention, I provide a yieldable holding member, such as a cork disk, that is normally held stationary by a relatively powerful spring. This spring so frictionally holds the driven pointer as to require the application of considerable force to move it from indicating position.

A pawl member is mounted on the driven pointer for actuation by the driving pointer and is provided with a relatively sharp point for positive engagement with the yieldable holding member. By this construction, the driven pointer is substantially positively held in position against all of the ordinary vibrations and shocks encountered in service and permits the pointer to be readily set to its initial or zero position by hand.

In the accompanying drawings,

Figure 1 is a side view of a maximum-demand indicating device constructed in accordance with my invention, Fig. 2 is a front elevational view of the device shown in Fig. 1, parts broken away and omitted for clearness, and Fig. 3 is a sectional view, taken along the line III—III of Fig. 1.

Since the meter, for which my invention is adapted, constitutes no part of my present invention, it is not shown, and only those parts necessary to a full and complete understanding of my invention are set forth.

The device comprises, in general, an operating shaft 1, a driving pointer or deflecting member 2 that is mounted in fixed relation to the shaft 1, a driven pointer or deflecting member 3 that is mounted in freely relatively-movable relation to the shaft 1, an indicating dial 4, a holding member 5, a pawl member 6, a ratchet member 8, a holding spring 9, a second pawl 11, for actuating the ratchet 8, and an operating rod 12 that extends through a portion 14 of the meter casing and is provided with a handle 15 for resetting the pointer 3 to initial or zero position.

The yieldable holding member 5, preferably constructed of cork and of discoidal shape, surrounds the shaft 1 and is secured in fixed relation to the ratchet 8, the disk 5 and the ratchet 8 being both movably mounted relative to the shaft 1. A sleeve member 17, that is fixed to the ratchet 8 and the disk 5, and also relatively movable with respect to the shaft 1, is frictionally held stationary by the spring 9 that is suitably mounted on a stationary element 18. The spring 9 bears against the sleeve 17 with such force as to hold the ratchet 8 and the disk 5 against all ordinary shocks and jars encountered in service, to thereby constitute holding means for the driven pointer 3.

The pawl 6, that is pivotally mounted on the driven pointer 3 by a pivot pin 19, is provided with a relatively sharp point 20 for indenting the surface of the disk 5. This construction provides positive locking means against relative turning movement between the disk 5 and the pointer 3. A spring 21 is connected, at one end, to a lug 22 on the pointer 3, and, at its other end 23, to the pawl 6, to bias the latter towards operative engagement with the disk 5. A projection 25, on the pawl 6 lies in the path of movement of the driving pointer 2 so that, when the latter comes in substantial registery with the pointer 3, the pawl 6 will be automatically released from the disk 5 to permit further forward movement of the pointer 3 by the pointer 2.

When the driving force of the driving pointer 2 is withdrawn, that is, when the pointer 2 starts to return to its initial or zero position, the pawl 6 is again released to cause the point 20 to positively engage the disk 5.

By moving the rod 12 backward and forward along its longitudinal axis, by means of the handle member 15, resetting movement is transmitted to the driven pointer 3 through the pawl 11, the ratchet 8, the disk 5 and the pawl 6.

In a usual form of demand indicator, the maximum or driven pointer is frictionally held in position by a relatively light spring, against the resistance of which the driving pointer must act. This spring, being relatively weak, permits the ready displacement of the pointer from indicating position.

In the device of my invention, the driving pointer 2 does not act against the resistance of the spring 9 but, instead, acts only against the driven pointer 3, after releasing the pawl 6 from the disk 5. Thus, when the pointer 3 is not being driven by the pointer 2, the pointer 3 is substantially positively locked against even the more violent shocks, jars and vibrations that are likely to occur in service and transportation.

While I have shown and described a particular form of my invention, changes may be made therein without departing from the spirit and scope thereof, and I desire, therefore, that only such limitations shall be placed thereon as are imposed by the prior art.

I claim as my invention:

1. The combination with a driving member and a driven member actuated by said driving member, of a holding member and means co-operating between the driven and holding members and releasable by the driving member prior to movement of the driven member by the driving member for positively holding the driven member against movement relative to the holding member.

2. The combination with driving and driven members, of a holding member and means, releasable by the driving member, co-operating between the driven and holding members for positively locking the driven member against movement relative to the holding member in each direction of movement of the driven member.

3. The combination with a driving member and a driven member actuated by said driving member, of a holding member and means co-operating between the driven and holding members responsive to movement of the driving member to permit the driven member to move free of the holding member and automatically effective to positively hold the driven member against movement relative to the holding member in response to reverse movement of the driving member.

4. In a demand-indicating device, the combination with driving and driven members, of a normally stationary holding member movable relative to the driven member and frictionally held against movement, and means co-operating between the driven and holding members for positively holding the driven member against movement relative to the holding member.

5. In a demand-indicating device, the combination with driving and driven elements, of means for releasably holding the driven element in position, comprising a yieldable member and a member having a portion for indenting the surface of the yieldable member, one of said members being carried by the driven element and the other being normally stationary relative thereto.

6. In a demand-indicating device, the combination with driving and driven elements, of means for holding the driven element in position, comprising a normally stationary yieldable member and a member carried by the driven element, having a portion for indenting the surface of the yieldable member, said indenting member being movable to engage different surface portions of said yieldable member.

7. In a demand-indicating device, the combination with a periodically-reset operating shaft, a driving pointer secured thereto and a driven pointer relatively movably related to said shaft, of a holding member and an engaging member pivotally mounted on the driven pointer for releasable engagement with said holding member, said engaging member being released by the driving pointer upon movement thereof in one direction only.

8. In a demand-indicating device, the combination with a periodically-reset operating shaft, a driving pointer secured thereto and a driven pointer relatively-movably mounted thereon, of a yieldable disk relatively-movably mounted on the shaft, a pawl member pivotally mounted on the driven pointer and having a relatively sharp point, said pawl being normally so biased that the point thereof indents the surface of said disk, a ratchet secured to said disk, a second pawl co-operating with said ratchet and constituting means for returning the driven pointer to an initial position, and means for frictionally holding said disk against movement, said driving pointer operating to release said first pawl from said disk and to drive the driven pointer.

9. The combination with a driving member and a deflecting member moved thereby to deflection-indicating position, of means for preventing movement of said deflecting member from said position comprising a deformable surface and a member interposed between said surface and deflecting member, said interposed member coacting directly with said deformable surface.

10. The combination with a driving member and a deflecting member moved thereby to deflection-indicating position, of means for preventing movement in either direction of said deflecting member from said position comprising a deformable surface and a member interposed between said surface and deflecting member, said interposed member coacting directly with said deformable surface.

11. The combination with a driving member and a deflecting member moved thereby in one direction to deflection-indicating position, of means for locking said deflecting member in said position, and means for releasing said locking means prior to renewed movement of said deflecting member in said one direction.

12. The combination with a deflecting member and a releasable locking device therefor, of means for moving said member to a predetermined initial position while substantially locked and immovable with respect to said device.

13. The combination with a driving member and a deflecting member moved thereby in one direction to deflection-indicating position, of means for locking said deflecting member in said position, means for releasing said locking means prior to renewed movement of said deflecting member in said one direction, and means for returning said deflecting member to an initial position with said deflecting member locked by said locking means.

In testimony whereof, I have hereunto subscribed my name this 6th day of April 1925.

ALBERT ROTH.